United States Patent
Nishikawa

(10) Patent No.: US 10,613,311 B2
(45) Date of Patent: Apr. 7, 2020

(54) THREE-DIMENSIONAL DRIFT CONTROL APPARATUS AND MICROSCOPE APPARATUS

(71) Applicant: NIKON CORPORATION, Tokyo (JP)

(72) Inventor: So Nishikawa, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/288,397

(22) Filed: Oct. 7, 2016

(65) Prior Publication Data

US 2017/0023785 A1 Jan. 26, 2017

Related U.S. Application Data

(60) Division of application No. 13/346,163, filed on Jan. 9, 2012, now Pat. No. 9,494,784, which is a
(Continued)

(30) Foreign Application Priority Data

Jul. 13, 2009 (JP) ................... 2009-164388

(51) Int. Cl.
  *G02B 21/36* (2006.01)
  *G02B 23/00* (2006.01)
  (Continued)

(52) U.S. Cl.
  CPC ............. *G02B 21/26* (2013.01); *G02B 21/06* (2013.01); *G02B 21/245* (2013.01); *G02B 21/365* (2013.01)

(58) Field of Classification Search
  CPC .... G02B 21/365; G02B 21/06; G02B 21/361; G02B 21/16
  (Continued)

(56) References Cited

U.S. PATENT DOCUMENTS 5,483,079 A  1/1996  Yonezawa
5,530,237 A  6/1996  Sato et al.
(Continued)

FOREIGN PATENT DOCUMENTS

CN  1384384 A  12/2002
DE  102006027836 A1  12/2007
(Continued)

OTHER PUBLICATIONS

Chinese Office Action dated Jul. 5, 2013 in corresponding Chinese Patent Application No. 201080040703.7.
(Continued)

*Primary Examiner* — Bumsuk Won
*Assistant Examiner* — Tamara Y. Washington

(57) ABSTRACT

A three-dimensional direction drift control apparatus and a microscope apparatus that correct misalignment of a relative position between an object lens and a sample. A near-infrared light emitted from a light source is irradiated onto a surface of a glass cover holding a sample on a stage. When the near-infrared light is irradiated onto the glass cover, a regular reflection light and scattered light of the near-infrared light are generated, and the regular reflection light and the scattered light enter a half-mirror via lenses from an objective lens to an offset lens group. A clamp processing unit detects misalignment in the lateral direction of the object lens with respect to the sample based on the image of the scattered light, which has been reflected by the half-mirror and entered a two-dimensional photoelectric converter, and controls a drive unit according to this detection result, whereby the stage is moved.

6 Claims, 3 Drawing Sheets

Related U.S. Application Data continuation of application No. PCT/JP2010/061807, filed on Jul. 13, 2010.

(51) Int. Cl.
*G02B 21/26* (2006.01)
*G02B 21/24* (2006.01)
*G02B 21/06* (2006.01)

(58) Field of Classification Search
USPC ......... 359/362–363, 368, 379–381, 391, 393
See application file for complete search history.

(56) References Cited

U.S. PATENT DOCUMENTS

| | | | |
|---|---|---|---|
| 6,842,281 B2 | 1/2005 | Tsurumune et al. | |
| 2004/0113043 A1 | 6/2004 | Ishikawa et al. | |
| 2006/0157637 A1 | 7/2006 | Karasawa et al. | |
| 2007/0253733 A1 | 11/2007 | Fey | |
| 2008/0111911 A1 | 5/2008 | Kawanabe | |
| 2008/0304142 A1 | 12/2008 | Klinkhamer | |
| 2010/0033811 A1 | 2/2010 | Westphal et al. | |
| 2010/0195868 A1* | 8/2010 | Lu ..................... | G02B 21/0084 382/103 |
| 2011/0127406 A1 | 6/2011 | Sase | |

FOREIGN PATENT DOCUMENTS

| | | |
|---|---|---|
| EP | 0405507 A2 | 1/1991 |
| EP | 0405507 A3 | 1/1991 |
| JP | 2001-311866 | 11/2001 |
| JP | 2004-133156 | 4/2004 |
| JP | 2007-148161 | 6/2007 |
| JP | 2008-122857 | 5/2008 |
| JP | 2008-262100 | 10/2008 |
| JP | 2008-262100 A | 10/2008 |
| JP | 2008262100 A * | 10/2008 |
| JP | 2009-36969 | 2/2009 |
| WO | 2009/031477 A1 | 3/2009 |

OTHER PUBLICATIONS

International Search Report dated Jul. 13, 2010 for International Application No. PCT/JP2010/061807.
Restriction Office Action dated Sep. 27, 2013 in parent U.S. Appl. No. 13/346,163 (7 pages).
Non-Final Office Action dated Feb. 28, 2014 in parent U.S. Appl. No. 13/346,163 (21 pages).
Advisory Action dated Mar. 24, 2015 in parent U.S. Appl. No. 13/346,163 (3 pages).
Final Office Action dated Nov. 6, 2014 in parent U.S. Appl. No. 13/346,163 (12 pages).
Non-Final Office Action dated Oct. 7, 2015 in parent U.S. Appl. No. 13/346,163 (12 pages).
Notice of Allowance dated Jul. 7, 2016 in parent U.S. Appl. No. 13/346,163 (11 pages).
U.S. Appl. No. 13/346,163, filed Jan. 9, 2012, So Nishikawa, Nikon Corporation Tokyo, JP.
Extended European Search Report dated Mar. 16, 2018 in corresponding European Patent Application No. 10799826.2.
Extended European Search Report dated Nov. 28, 2017 in corresponding European Patent Application No. 10799826.2.
European Office Action in corresponding European Application No. 10 799 826.2 dated Apr. 8, 2019 (five pages).

* cited by examiner

THREE-DIMENSIONAL DRIFT CONTROL APPARATUS AND MICROSCOPE APPARATUS

CROSS-REFERENCE TO RELATED APPLICATIONS

This is a divisional application of U.S. patent application Ser. No. 13/346,163, filed on Jan. 9, 2012, which is a continuing application, filed under 35 U.S.C. § 111(a), of International Application PCT/JP2010/061807, filed Jul. 13, 2010, which claims priority benefit of Japanese Application No. 2009-164388, filed Jul. 13, 2009, all of which are incorporated by reference herein in their entireties.

TECHNICAL FIELD

The present invention relates to a three-dimensional direction drift control apparatus and a microscope apparatus, and more particularly to a three-dimensional direction drift control apparatus and a microscope apparatus which can correct relative positions between an objective lens and a sample in a plane direction, quickly and accurately.

BACKGROUND ART

Lately the usefulness of a microscope having an auto focus function is becoming recognized in the market place. If the auto focus function of active control, for constantly focusing on a sample, is used, blur and movement of an observation image, generated during a time lapse observation over a long period of time, or when a reagent is administered into a container, can be effectively removed.

There are roughly two types of methods for implementing the auto focus function are roughly divided: the passive method and the active method.

In the case of the passive method, for example, a blur of an observation image is detected based on the change of the position of the objective lens at which the contrast of the observation image of the sample is maximum, and the change amount of this position is fed back to the stage and drive unit of the objective lens, whereby focusing on the sample is maintained. According to this method, not only is a change of the position of the objective lens in the optical axis direction detected, but also a change of the relative positions between the objective lens and the sample in a direction perpendicular to the optical axis direction (hereafter called "plane direction") is detected, therefore misalignment of the relative positions in the plane direction can be corrected (compensated).

Whereas in the case of the active method represented by a slit projection type, misalignment of the relative positions between an objective lens and a sample in the optical axis direction is detected based on the change of the position of an image of the reflected light of infrared irradiated onto a cover glass holding the sample, hence quick focusing is possible (e.g. Patent Document 1).

In the mean time, as current ultra-resolution technology advances, microscope observation at nanometer precision, which exceeds the resolution of an optical microscope, is receiving attention. However in the case of observation in the resolution range, a micro-change of the observation position of the sample in the observation field of view, generated by the mechanical drift of the apparatus and the thermal expansion of cover glass, which have not been major problems, cannot be ignored. Therefore a technology to maintain the relative positions between the objective lens and the sample in three-dimensional directions is demanded.
Patent Document 1: Japanese Patent Application Laid-Open No. 2008-122857

With the above mentioned prior art, however, if misalignment is generated in the relative positional relationship between the objective lens and the sample, it is difficult to quickly and accurately correct the misalignment.

In the case of the passive method, for example, the change of the relative positions between the objective lens and the sample can be compensated in three-dimensional directions, but if the brightness and contrast of the sample are low, image analysis takes time, and delay or an error occurs in focusing. And in the case of the active method, the change of the relative positions between the objective lens and the sample in the plane direction cannot in theory be detected.

DISCLOSURE OF THE INVENTION

With the foregoing in view, it is an object of the present invention to correct misalignment of the relative positions between an objective lens and a sample quickly and accurately.

A three-dimensional direction drift control apparatus of an embodiment of the present invention has: an objective lens; a light source that irradiates an illumination light onto a sample or a holding member via the objective lens; a first light receiving unit that receives, via the objective lens, a regular reflection light regularly reflected on the sample or the holding member irradiated by the illumination light; a first control unit that generates a first control signal which indicates a relative misalignment between the objective lens and the sample or the holding member in the optical axis direction, based on a signal obtained by the first light receiving unit receiving the regular reflection light; a second light receiving unit that receives, via the objective lens, scattered light generated by the illumination light irradiating onto the sample or the holding member; and a second control unit that generates a second control signal which indicates a relative misalignment between the objective lens and the sample or the holding member in a direction perpendicular to the optical axis, based on the signal obtained by the second light receiving unit receiving the scattered light.

Moreover, a three-dimensional direction drift control apparatus of an embodiment of the present invention has: an objective lens; a first light source that irradiates an illumination light onto a sample or holding member via the objective lens; a first light receiving unit that receives, via the objective lens, a regular reflection light regularly reflected on the sample or the holding member irradiated by the illumination light; a first control unit that generates a first control signal which indicates a relative misalignment between the objective lens and the sample or the holding member in an optical axis direction, based on a signal obtained by the first light receiving unit receiving the regular reflection light; a second light source that irradiates a reference light of which wavelength is different from that of the illumination light onto the sample or the holding member; a second light receiving unit that receives, via the objective lens, scattered light generated by the reference light irradiating onto the sample or the holding member; and a second control unit that generates a second control signal which indicates a relative misalignment between the objective lens and the sample or the holding member in a direction perpendicular to the optical axis, based on a signal obtained by the second light receiving unit receiving the scattered light.

A microscope apparatus of an embodiment of the present invention is a microscope apparatus for observing a sample on a holding member, comprising: an observation optical system having an image forming surface at a position conjugate with the sample; an image forming optical system including an image forming surface at a position conjugate with a surface of the holding member; an imaging unit that is disposed on the image forming surface of the image forming optical system; and a control unit that detects a change of an image on the surface of the holding member captured by the imaging unit.

According to the present invention, misalignment of the relative positions between the objective lens and the sample can be corrected quickly and accurately.

BEST MODE FOR CARRYING OUT THE INVENTION

Embodiments of the present invention will now be described with reference to the drawings.

First Embodiment

[Configuration of Microscope]

Figure 1:
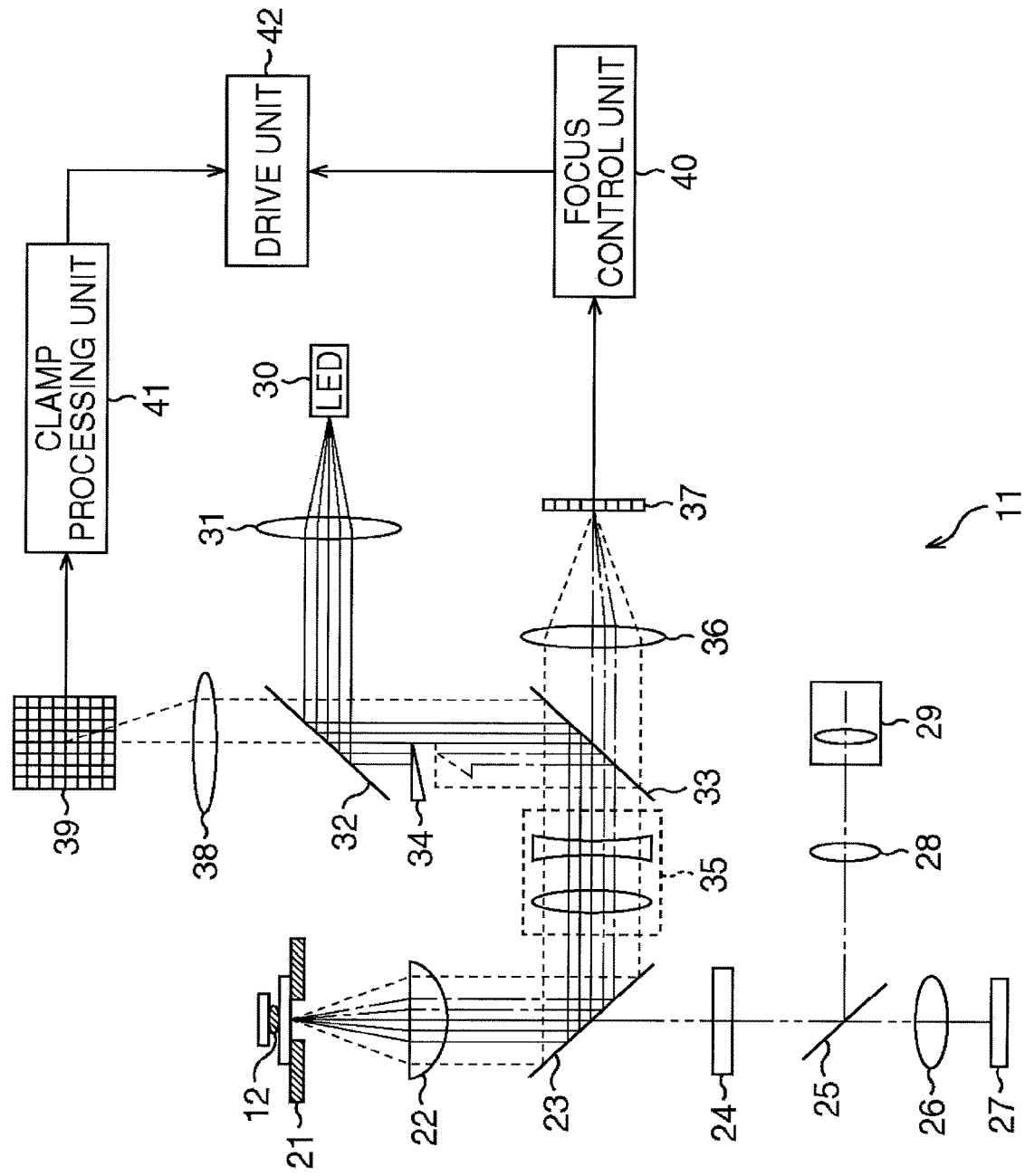
FIG. 1 is a diagram depicting a configuration example of an embodiment of a microscope to which the present invention is applied.

FIG. 1 is a configuration example of an embodiment of a microscope to which the present invention is applied.

A microscope 11 is an optical microscope for forming an enlarged image of an observation object sample 12 and observing the sample 12. The sample 12, which is emersed in such a medium as water, is between a cover glass and a slide glass, and is placed on a stage 21. The cover glass and the slide glass holding the sample 12 are also called "holding members other than observation object".

An illumination apparatus (not illustrated) is installed on the microscope 11, and the illumination apparatus emits a visible light, which is an illumination light, and illuminates the sample 12. For example, if the illumination apparatus is a transmission type, the illumination apparatus is disposed above the stage 21 in FIG. 1, and if the illumination apparatus is an epi-illumination type, the illumination apparatus is disposed below the stage 21 in the drawings.

If the illumination light from the illumination apparatus is irradiated onto the sample 12, the sample 12 emits an observation light, and the observation light forms an image by an observation optical system of the microscope 11. In other words, the observation light from the sample 12 enters a half-mirror 25 via an objective lens 22, a dichroic mirror 23 and an infrared cut-off filter 24.

A part of the observation light that is entering the half-mirror 25 simply transmits through the half-mirror 25 and is collected by a second objective lens (for a camera) 26, and the image of the observation light is captured by a CCD (Charge Coupled Device) sensor 27. The observation image of the sample 12 captured by the CCD sensor 27 is supplied to a monitor (not illustrated) where the observation image is displayed.

A part of the observation light that is entering the half-mirror 25 is reflected by the half-mirror 25, and is collected by a second objective lens (for an eye piece) 28 and an eye piece 29, and forms an image. The image of the observation light is observed by a user who looks through the eye piece 29.

Thus in the microscope 11, an image of the observation light, that is, an enlarged image of the sample 12, is formed by the observation optical system constituted by lenses from the objective lens 22 and the eye piece 29. The dichroic mirror 23 is disposed in an afocal system of the observation light. Instead of the half-mirror 25, a prism which separates the entered observation light according to a predetermined distribution ratio may be installed. In this case, the observation light which entered the prism is reflected by a predetermined ratio, and the reflected light enters the second objective lens (for an eye piece) 28, and the rest of the observation light transmits through the prism and enters the second objective lens (for a camera) 26.

The microscope 11 also includes an auto clamp mechanism for continuously maintaining the focal position of the objective lens 22 at a predetermined position on the sample 12. This auto clamp mechanism is constituted by an illumination optical system that irradiates a near-infrared light onto the surface of the cover glass holding the sample 12, an image forming optical system that forms an image of light generated by the near-infrared light irradiated onto the surface of the cover glass, and a control system that moves the stage 21 based on a signal obtained by receiving the image formed by the image forming optical system.

In concrete terms, a light source 30 constituted by an LED (Light Emitting Diode), among other components, is installed in the microscope 11, and a near-infrared light emitted from the light source 30 is shaped by a lens 31 so that the cross-section of the light becomes circular, and enters a half-mirror 32. The near-infrared light that is entering the half-mirror 32 is reflected by the half-mirror 32, and is then reflected again by the half-mirror 33.

A knife edge 34 is disposed between the half-mirror 32 and the half-mirror 33, and a part of the near-infrared light that is entering the half-mirror 33 from the half-mirror 32 is shielded by the knife edge 34. Therefore the near-infrared light that is entering the half-mirror 33 is shaped by the knife edge 34 so that the cross-section of the light becomes semi-circular.

The near-infrared light reflected by the half-mirror 33 transmits through the offset lens group 35 constituted by a plurality of lenses, is reflected by the dichroic mirror 23, is collected by the objective lens 22, and is irradiated onto the cover glass on the stage 21. The reflection surface of the dichroic mirror 23 simply transmits the observation light from the sample 12, and reflects the near-infrared light.

Thus in the microscope 11, the near-infrared light is irradiated onto the cover glass on the stage 21 by the illumination optical system constituted by the light source 30 to the offset lens group 35, the dichroic mirror 23 and the objective lens 22. In FIG. 1, the solid line indicates an optical path of the near-infrared light. The light source 30 is not limited to an LED, but may be a different light source, such as a laser. The cross-section of the near-infrared light emitted from the light source 30 is not limited to a circular shape, but may be a rectangular shape.

For example, in the microscope 11, the near-infrared light forms an image on the surface of the cover glass holding the sample 12, or on the boundary surface between the cover glass and the sample 12. Basically the near-infrared light that is entering the surface of the cover glasses regularly reflected by the surface, but a plurality of micro-scratches (bumps) normally exist on the surface of the cover glass, and a part of the near-infrared light is scattered due to these bumps on the surface of the cover glass.

Hence if a near-infrared light is irradiated onto the surface of the cover glass, the regular reflection light, scattered light and diffracted light of the near-infrared light are generated, and the regular reflection light and the scattered light (scattered light/diffracted light are generically called "scattered light" hereafter) are recovered (enter) the objective lens 22. Here, out of the near-infrared lights that reach the object lens 22 from the cover glass, the near-infrared light regularly reflected by the cover glass is called "regular reflection light", and out of the near infrared lights that reach the objective lens 22, light excluding the regular reflection light is called "scattered light".

The regular reflection light that is entering the objective lens 22 from the cover glass is reflected by the dichroic mirror 23, and enters the half-mirror 33 via the offset lens group 35. A part of the regular reflection light that is entering the half-mirror 33 is reflected by the half-mirror 33, and is shielded by the knife edge 34. Therefore the regular reflection light reflected by the half-mirror 33 does not enter the half-mirror 32. In order to shield the regular reflection light with more certainty, it is preferable that the knife edge 34 is disposed so that the near-infrared light from the light source 30 is shielded by a little more than half of the quantity [of the near-infrared light]. In order to shield the regular reflection light with more certainty, a slit may be disposed between the half-mirror 32 and the lens 38.

A part of the regular reflection light that is entering the half-mirror 33 simply transmits through the half-mirror 33, is collected by a lens 36, and enters a line sensor 37. Here the lens 36 is disposed in a position that is conjugate with the objective lens 22, and forms an image of the regular reflection light (slit image). In the image forming position of the regular reflection light, that is, a position conjugate with the image of the near-infrared light, the light receiving surface of the line sensor 37 is disposed.

The line sensor 37 receives the regular reflection light that enters through the lens 36, and performs photoelectric conversion to obtain an electric signal. This electric signal is used for correcting misalignment of the relative positions of the objective lens 22 and the sample 12 in the direction of the optical axis of the objective lens 22 (hereafter called "z direction"). In other words, [this signal] is used for auto focus control of the objective lens 22.

In FIG. 1, the dashed line indicates an optical path of the regular reflection light from the cover glass. Hereafter the misalignment of the relative positions of the objective lens 22 and the sample 12 (cover glass) in the z direction is also called "misalignment in the z direction". The line sensor 37 may be constituted by a position detector, such as a CCD and a PSD (Position Sensitive Detector).

On the other hand, the scattered light of the near-infrared light that is entering the objective lens 22 from the cover glass is reflected by the dichroic mirror 23 and enters the half-mirror 33 via the offset lens group 35. A part of the scattered light that is entering the half-mirror 33 is reflected by the half-mirror 33 and enters the half-mirror 32. At this time, a part of the scattered light that is entering the half-mirror 32 is shielded by the knife edge 34.

A part of the scattered light that is entering the half-mirror 32 simply transmits through the half-mirror 32, is collected by a lens 38, and enters a two-dimensional photoelectric converter 39. Here the lens 38 is disposed in a position that is conjugate with the objective lens 22, and forms an image of the scattered light on the light receiving surface of the two-dimensional photoelectric converter 39 by the lens 38. This image of the scattered light is an image on the surface of the cover glass. In other words, the image on the surface of the cover glass is formed by the scattered light on the image forming surface of the lens 38.

The two-dimensional photoelectric converter 39 is constituted by a CCD, among other components, and obtains an electric signal by receiving the scattered light that enters from the lens 38, and obtains an electric signal by performing photoelectric conversion. This electric signal is picture data of a picture of a scattering image, which represents a scattering pattern of the near-infrared light on the surface of the cover glass. The electric signal is used for correcting misalignment of the relative positions of the objective lens 22 and the sample 12 in a direction perpendicular to the z direction (hereafter called "xy direction"), that is, [the signal] is used for clamp processing of the objective lens 22 in the xy direction.

Hereafter the picture based on the electric signal that is output from the two-dimensional photoelectric converter 39 is also called "scattering picture". In FIG. 1, a dotted line indicates an optical path of the scattered light. The scattered light is a light scattered by the surface of the cover glass, therefore the quantity of the scattered light is less than that of the regular reflection light, but the luminous flux of the scattered light is thicker than the luminous flux of the regular reflection light. Hereafter misalignment of the relative positions between the objective lens 22 and the sample 12 (cover glass) in the xy direction is also called "misalignment in the xy direction".

Thus in the microscope 11, the image of the regular reflection light of the near-infrared light and the scattering image of the near-infrared light, due to the bumps on the surface of the cover glass, are formed by the image formation optical system constituted by the objective lens 22, the dichroic mirror 23, the offset lens group 35 to the half-mirror 32, the lens 36 and the lens 38.

One optical system is constituted by: an optical system to guide the scattered light into the two-dimensional photoelectric converter 39 in the image forming optical system, that is, an optical system constituted by the objective lens 22, the dichroic mirror 23, the offset lens group 35 to the half-mirror 32 and the lens 38; and an illumination optical system. By this optical system, the near-infrared light is irradiated onto the surface of the cover glass and, out of the regular reflection light and scattered light generated by this [irradiation], only the scattered light is extracted. In other words, the regular reflection light, that is unnecessary for the clamp processing in the xy direction, is removed from the positive reflection light and the scattered light.

As a control system of the stage 21 constituting the auto clamp mechanism of the microscope 11, the microscope 11 further comprises a focus control unit 40, a clamp processing unit 41 and a drive unit 42.

The focus control unit 40 detects a change amount of the relative positions of the objective lens 22 and the sample 12 in the z direction based on the electric signal supplied by the line sensor 37, and controls the drive unit 42 according to this detection result, whereby movement of the stage 21 in the z direction is controlled. Based on the electric signal supplied by the two-dimensional photoelectric converter 39, the clamp processing unit 41 detects a change amount of the relative positions of the objective lens 22 and the sample 12 in the xy direction, and controls the drive unit 42 according to this detection result, whereby the movement of the stage 21 in the xy direction is controlled.

The drive unit 42 drives and moves the stage 21 according to the control by the focus control unit 40 and the clamp processing unit 41. In the microscope 11, the relative positional relationship between the objective lens 22 and the sample 12 in the z direction is changed by moving the stage 21 in the z direction, but the objective lens 22 may be moved with respect to the stage 21.

[Operation of Microscope]

Operation of the microscope 11 will now be described.

If the user operates the microscope 11 and instructs the observation of the sample 12, the illumination apparatus (not illustrated) of the microscope 11 irradiates the illumination light onto the sample 12. Then an observation light is emitted from the sample 12 by the irradiation of the illumination light, and the observation light enters the half-mirror 25 via the observation lens 22 to the infrared cut-off filter 24. At this time, out of the lights from the sample 12, light of which wavelength is different from that of the observation light, such as a near-infrared light from the light source 30, is removed by the infrared cut-off filter 24.

A part of the observation light that is entering the half-mirror 25 transmits through the half-mirror 25, is collected by the second objective lens (for a camera) 26, and enters the CCD sensor 27. Then the observation image captured by the CCD sensor 27 is displayed on the monitor. A part of the observation light that is entering the half-mirror 25 is reflected by the half-mirror 25, is collected by the second objective lens (for an eye piece) 28 and the eye piece 29, and forms an image. Thereby the user can observe the sample 12 by viewing the observation image displayed on the monitor or by looking through the eye piece 29.

At this time, the microscope 11 emits the near-infrared light from the light source 30. When the observation of the sample 12 is started, the collecting position of the near-infrared light from the light source 30 and the focal position of the objective lens 22 are the same. Therefore the focal position of the objective lens 22 comes on the surface of the cover glass when the focus control unit 40 performs the auto focus control.

Therefore the user operates the microscope 11 and moves the offset lens group 35 so as to focus on the sample 12. Then, according to the operation of the user, the microscope 11 moves the lenses constituting the offset lens group 35 in a direction parallel with the optical axis (optical path of the near-infrared light) of the offset lens group 35. If the lenses of the offset lens group 35 are moved, only the image forming position of the near-infrared light irradiated onto the cover glass is shifted in the z direction, without changing the image forming positions of the regular reflection light and scattered light. In this case, the image forming position of the illumination light does not change either.

If the offset lens group 35 is moved like this, the near-infrared light does not form an image on the surface of the cover glass. Then the focus control unit 40 moves the stage 21 by the auto focus control, so that the image of the near-infrared light is continuously formed in a predetermined position on the cover glass. Hence if the user moves the offset lens group 35 appropriately, the near-infrared light forms an image on the surface of the cover glass, and the sample 12 is also focused.

If the near-infrared light starts to form an image in a predetermined position on the cover glass like this, the microscope 11 maintains the relative positional relationship between the objective lens 22 and the sample 12, so that the near-infrared light continuously forms an image in this predetermined position.

In other words, the near-infrared light from the light source 30 is collected by the lens 31 and is shaped, and enters the objective lens 22 via the half-mirror 32 to the dichroic mirror 23. The objective lens 22 collects the near-infrared light from the dichroic mirror 23 on the front focus of the objective lens 22. In this case, a part of the near-infrared light that is entering the objective lens 22 is shielded by the knife edge 34, therefore the cover glass is obliquely irradiated by the near-infrared light.

If the near-infrared light is irradiated onto the surface of the cover glass, the regular reflection light and scattered light of the near-infrared light are generated, and these lights enter the half-mirror 33 via the objective lens 22, the dichroic mirror 23 and the offset lens group 35. The regular reflection light and the scattered light that transmit through the half-mirror 33 are collected by the lens 36 and enter the line sensor 37. Out of the regular reflection light and the scattered light reflected by the half-mirror 33, the regular reflection light and a part of the scattered light are shielded by the knife edge 34, and the rest of the scattered light transmits through the half-mirror 32, is collected by the lens 38, and enters the two-dimensional photoelectric converter 39.

Here the position of the image of the regular reflection light on the light receiving surface of the line sensor 37 changes according to the distance between the objective lens 22 and the surface of the cover glass (sample 12) in the z direction. Therefore the focus control unit 40 records, in advance, the image forming position of the regular reflection light on the light receiving surface of the line sensor 37 upon the near-infrared light forming an image on the surface of the cover glass (this position is hereafter called "reference image forming position").

The focus control unit 40 detects misalignment of the objective lens 22 in the z direction based on the recorded reference image forming position and an electric signal supplied by the line sensor 37. For example, misalignment of the relative positional relationship between the objective lens 22 and the sample 12 is generated when the positions of the cover glass and the slide glass holding the sample 12 are slightly shifted or inclined on the stage 21.

If misalignment of the objective lens 22 in the z direction is detected, the focus control unit 40 determines a moving direction and a moving distance of the stage 21 for correcting misalignment in the z direction, based on the shifting direction of the position of the image of the regular reflection light on the light receiving surface of the line sensor 37 with respect to the reference image forming position and the amount of this shift. Based on the determined moving direction and moving distance, the focus control unit 40 controls the drive unit 42 and moves the stage 21 in the z direction. Thereby misalignment in the z direction is corrected, and the near-infrared light from the objective lens 22 is formed on the surface of the cover glass.

Not only the regular reflection light, but also a part of the scattered light enter the line sensor 37, this however does not affect detecting the position of the image of the regular reflection light since the quantity of the scattered light is much less than the quantity of the regular reflection light.

If misalignment in the z direction is corrected like this, the clamp processing unit 41 detects misalignment of the objective lens 22 in the xy direction based on the electric signal from the two-dimensional photoelectric converter 39, and corrects misalignment in the xy direction according to this detection result.

In other words, the clamp processing unit 41 detects misalignment of the objective lens 22 in the xy direction by performing pattern matching using two scattering pictures captured at different timings. For example, the clamp processing unit 41 temporarily holds a scattering picture captured before the current time (in the past) as a reference picture, and determines the position of the scattering image on the reference picture and the position of the scattering image on the newly captured scattering picture by pattern matching. Then the clamp processing unit 41 determines the moving direction and moving distance of the scattering image on the xy plane as misalignment in the xy direction. This scattering picture is a picture of the surface of the cover glass, therefore the clamp processing unit 41 detects the change of the position of the image of the surface of the cover glass.

Then based on the detected misalignment in the xy direction, the clamp processing unit 41 determines the moving direction and moving distance of the stage 21 to correct misalignment, and controls the drive unit 42 and moves the stage 21 in the moving direction by the determined moving distance. Thereby the near-infrared light from the objective lens 22 forms an image in a predetermined position on the cover glass.

Since misalignment in the xy direction is detected and corrected after misalignment in the z direction is corrected, that is after the sample 12 is focused, misalignment in the xy direction can be detected in a state where the contrast of the scattering image on the scattering picture is maximum. Therefore misalignment in the xy direction can be detected and corrected more quickly and accurately.

The reference picture that is held in the clamp processing unit 41 may be updated by a scattering picture captured most recently every time pattern matching is performed, or may be the scattering picture captured when the observation of the sample 12 is started. If the reference picture is updated at a certain interval, a drop in accuracy of the pattern matching can be prevented, even if the scattering image on the scattering picture changes over time.

When misalignment of the objective lens 22 in the xy direction is corrected, the distance of moving the stage 21 by one correction may be limited. In this case, the clamp processing unit 41 moves the stage 21 within the predetermined range of the moving distance. Thereby an extreme malfunction due to an abnormal pattern matching result can be avoided.

If the moving distance of the stage 21 is limited by this operation, the clamp processing unit 41 discards the reference picture being held, and uses the newly captured scattering picture as the reference picture. Thereby a drop in accuracy to detect misalignment in the xy direction using pattern matching can be prevented.

If misalignment in the xy direction is detected and corrected like this, the near-infrared light forms an image on a predetermined position on the cover glass. In order to maintain this state, the microscope 11 then alternately repeats: a processing to detect misalignment of the objective lens 22 in the z direction, and correct misalignment in the z direction based on this detection result; and a processing to detect misalignment of the objective lens 22 in the xy direction and correct misalignment in the xy direction based on this detection result.

As a result, the relative positional relationship between the objective lens 22 and the sample 12 is fixed in the three-dimensional directions. In other words, the focal position of the objective lens 22 is always positioned in a desired area of the sample 12, and the user can observe the desired area of the sample 12 for a long time in a same position within the observation field of view of the objective lens 22.

Since the regular reflection light and the scattered light generated by irradiating the near-infrared light onto the cover glass are extracted respectively, and misalignment of the objective lens 22 in the z direction and misalignment thereof in the xy direction are detected, as described above, misalignment of the relative positions of the objective lens 22 and the sample 12 can be corrected more quickly and accurately.

In concrete terms, misalignment in the z direction is detected by extracting the regular reflection light of the near-infrared light, that is, by using the active method, whereby misalignment in the z direction can be detected and corrected more quickly than the passive method.

Furthermore misalignment in the xy direction is detected by extracting the scattered light of the near-infrared light, whereby misalignment in the xy direction can be detected more accurately than the passive method.

In the case of the passive method, misalignment in the xy direction is detected using the observation image, therefore if the brightness of the observation image is low, for example, sufficient detection accuracy may not be implemented depending on the state of the sample of the observation method itself and the observation environment of the sample. Further, if the sample is moved with respect to the slide glass, it cannot be discerned whether the sample itself moved or the slide glass is shifted with respect to the objective lens.

Whereas in the microscope 11, misalignment in the xy direction is detected based on the movement of the bump patterns on the surface of the cover glass holding the sample 12, that is, based on the movement of the scattering image of the near-infrared light, therefore misalignment can be more accurately detected regardless the state of the sample 12 itself and the observation environment of the sample 12. If misalignment in the xy direction is detected using the pattern matching of the scattering pictures, then the processing volume can be decreased and misalignment can be detected more quickly compared with the pattern matching using the observation image itself. Furthermore, in the case of the microscope 11, the stage 21 is moved so that the near-infrared light can always be collected in a predetermined position on the cover glass, therefore it can be discerned whether the sample 12 itself moved or the sample 12 did not move while the slide glass moved with respect to the objective lens 22.

It was described that misalignment in the xy direction is detected using the scattering image of the near-infrared light generated by the bumps on the surface, such as the scratches or the cover glass, but a mark or a scattering substance for clamping may be disposed on the surface of the cover glass in advance, and images of the near-infrared light scattered by a mark or a scattering substance may be used. If the sample 12 placed in a container, such as a dish, is set on the stage 21, then the near-infrared light may be irradiated onto the base of the container, so that misalignment in the z direction or in the xy direction is detected using the regular reflection light and the scattered light of the near-infrared light.

Second Embodiment

[Configuration of Microscope]

Figure 2:
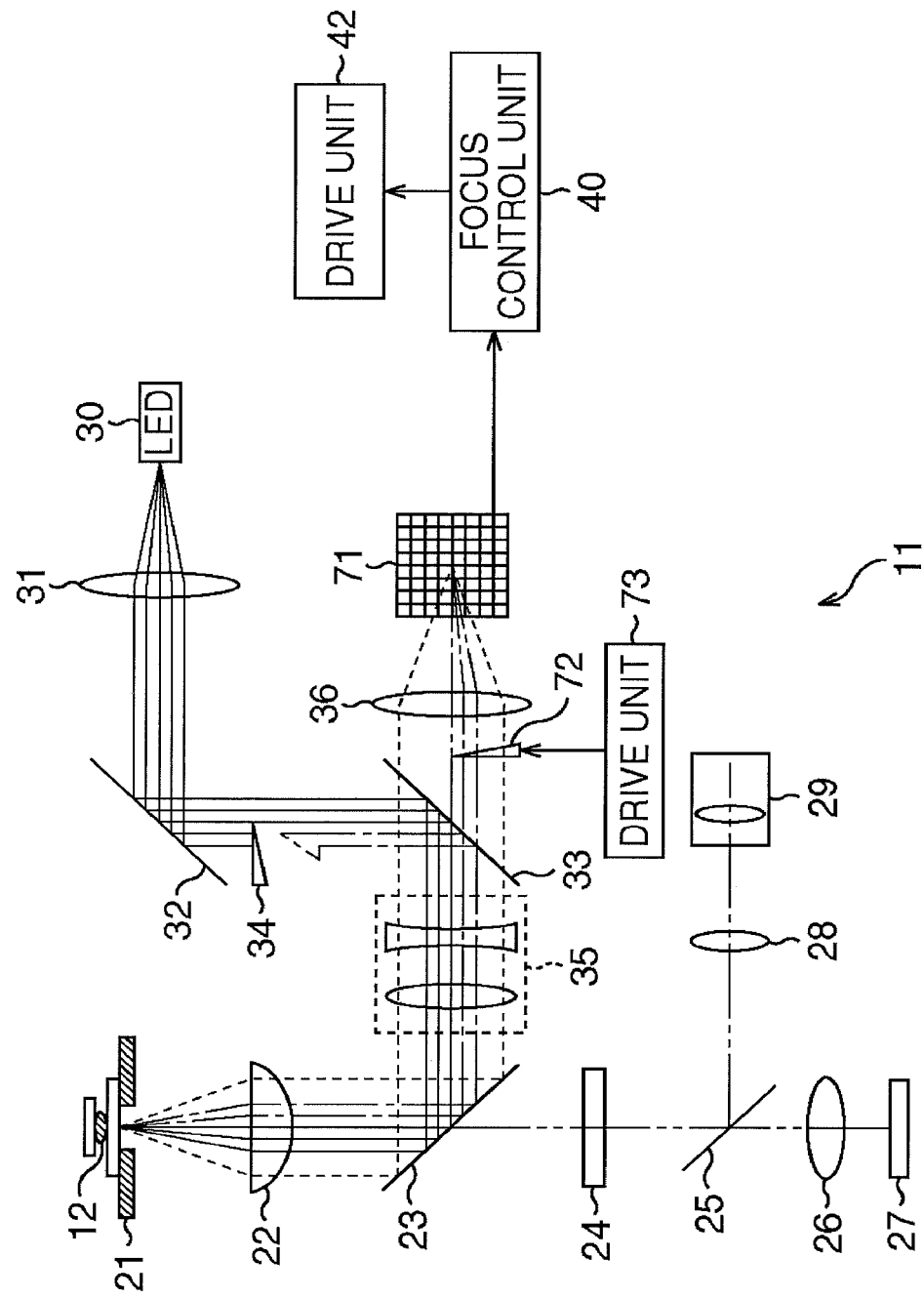
FIG. 2 is a diagram depicting a configuration example of another embodiment of a microscope to which the present invention is applied.

In the microscope 11, one picture element may alternately capture an image of the regular reflection light (slit image) and the scattering image. In this case, the microscope 11 is configured as illustrated in FIG. 2. In FIG. 2, a portion that corresponds to a portion in FIG. 1 is denoted with a same reference number, and description thereof is omitted unless necessary.

In the microscope 11 in FIG. 2, the lens 38, the two-dimensional photoelectric converter 39 and the clamp processing unit 41 in FIG. 1 are not installed, and a two-dimensional photoelectric converter 71 is installed instead of the line sensor 37 in FIG. 1. This two-dimensional photoelectric converter 71 is constituted by a CCD, among other components, and is disposed in a position that is conjugate with the image forming position of the near-infrared light irradiated onto the cover glass.

In the microscope 11, a knife edge 72, that shields the regular reflection light and a part of the scattered light entering the two-dimensional photoelectric converter 71 from the half-mirror 33, is disposed between the lens 36 and the half-mirror 33.

The knife edge 72 moves by being driven by the drive unit 73, and is either disposed between the lens 36 and the half-mirror 33 (hereafter called "inserted state"), or not disposed between the lens 36 and the half-mirror 33 (hereafter called "uninserted state"). If the knife edge 72 is in the inserted state, the regular reflection light and a part of the scattered light from the half-mirror 33 are shielded by the knife edge 72. If the knife edge 72 is in the uninserted state, the regular reflection light and the scattered light from the half-mirror 33 are collected by the lens 36, and enter the two-dimensional photoelectric converter 71.

In FIG. 2, the solid line, the dashed line and the dotted line indicate the optical paths of the near-infrared light, the regular reflection light and the scattered light respectively.

[Operation of Microscope]

Operation of the microscope 11 in FIG. 2 will now be described.

When observation of the sample 12 starts, the drive unit 73 sets the knife edge 72 in the uninserted state. Then the positive reflection light from the half-mirror 33 is collected by the lens 36, and enters a part of the light receiving surface of the two-dimensional photoelectric converter 71.

The two-dimensional photoelectric converter 71 captures an image of the entered regular reflection light, and supplies an electric signal obtained as a result of the capture to the focus control unit 40. Based on the supplied electric signal, the focus control unit 40 detects misalignment of the objective lens 22 in the z direction, and controls the drive unit 42 based on the detected misalignment, and moves the stage 21 so that misalignment in the z direction is offset.

If the knife edge 72 is in the uninserted state, the regular reflection light enters a part of the light receiving surface of the two-dimensional photoelectric converter 71. At this time, the light receiving surface of the two-dimensional photoelectric converter 71, where the regular reflection light enters, functions as the line sensor 37 in FIG. 1.

If misalignment in the z direction is detected and corrected, the drive unit 73 moves the knife edge 72 to be in the inserted state. Then the regular reflection light from the half-mirror 33 is shielded by the knife edge 72, hence only a part of the scattered light from the half-mirror 33 is collected by the lens 36, and enters the two-dimensional photoelectric converter 71.

The two-dimensional photoelectric converter 71 captures an image of the scattered light from the lens 36, and supplies an electric signal of the scattering picture obtained as a result of the capture to the focus control unit 40. Based on the scattering picture from the two-dimensional photoelectric converter 71, the focus control unit 40 detects the misalignment of the objective lens 22 in the xy direction using pattern matching, controls the drive unit 42 based on this detection result, and moves the stage 21. Thereby misalignment of the objective lens 22 in the xy direction is offset. At this time, the focus control unit 40 holds the scattering picture captured before this current time as a reference picture used for pattern matching, and updates the reference picture as necessary.

If misalignment in the xy direction is corrected like this, the misalignment of a relative position of the objective lens 22 with respect to the sample 12 in the z direction is detected, and the processing to correct this misalignment and the processing to detect the misalignment of the relative position of the objective lens 22 with respect to the sample 12 in the xy direction and to correct the misalignment are alternately repeated. Thereby the state of the near-infrared light continuously forming an image in a predetermined position of the cover glass is maintained.

Thus misalignment of the relative positions of the objective lens 22 and the sample 12 can also be corrected quickly and accurately by the driving unit 73 driving the knife edge 72, and alternately detecting misalignment in the z direction and misalignment in the xy direction in time-division. Particularly in the case of the microscope 11 in FIG. 2, the lens 38 and the two-dimensional photoelectric converter 39 in FIG. 1 are not required, therefore the size of the microscope 11 can be downsized.

Third Embodiment

[Configuration of Microscope]

Figure 3:
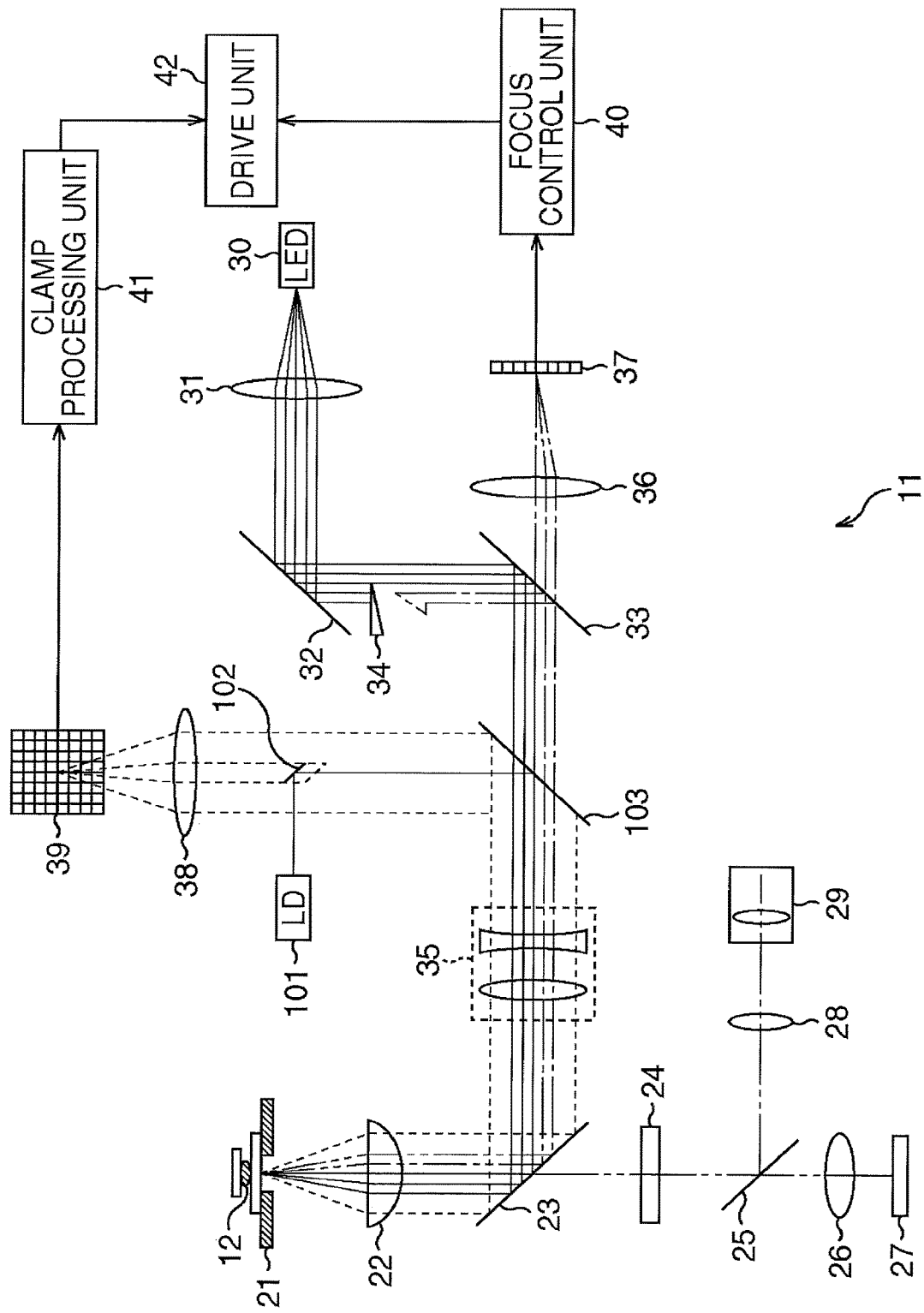
FIG. 3 is a diagram depicting a configuration example of another embodiment of a microscope to which the present invention is applied.

An example of using the near-infrared light to detect misalignment in the xy direction and in the z direction was described, but a light having a different wavelength may be used for each direction. In this case, the microscope 11 has the configuration illustrated in FIG. 3, for example. In FIG. 3, a portion that corresponds to a portion in FIG. 1 is denoted with a same reference number, and description thereof is omitted unless necessary.

In the microscope 11 in FIG. 3, a light source 101, which is constituted by an LD (Laser Diode) for example, and emits a reference light of which wavelength is different from that of the near-infrared light, is installed separately from the light source 30 for emitting the near-infrared light. The microscope 11 in FIG. 3 also includes a total reflection mirror 102 and a dichroic mirror 103.

The dichroic mirror 103 is disposed between the offset lens group 35 and the half-mirror 33, and separates the reference light and the near-infrared light. In other words, the dichroic mirror 103 simply transmits the entering near-infrared light and reflects the entering reference light. The total reflection mirror 102 totally reflects the reference light from the light source 101, so that the reference light enters the dichroic mirror 103.

In the microscope 11 in FIG. 3, the lens 38 and the two-dimensional photoelectric converter 39 are disposed on an extension of the optical path of the reference light, connecting the total reflection mirror 102 and the dichroic mirror 103.

In FIG. 3, the solid line, the dashed line and the dotted line indicate the optical paths of the near-infrared light, the reference light, the regular reflection light of the near-infrared light, and the scattered light of the reference light respectively.

[Operation of Microscope]

Operation of the microscope 11 in FIG. 3 will now be described.

When the observation of the sample 12 is started, the light source 30 and the light source 101 emit the near-infrared light and the reference light respectively. The near-infrared light from the light source 30 enters the dichroic mirror 103 via the lens 31 to the half-mirror 33.

Then the near-infrared light simply transmits through the dichroic mirror 103, then transmits through the offset lens group 35 to the objective lens 22, and is collected in a predetermined position on the cover glass holding the sample 12.

The regular reflection light, which is the near-infrared light regularly reflected by the cover glass, transmits through the dichroic mirror 103 via the objective lens 22 to the offset lens group 35, and enters the half-mirror 33. A part of the regular reflection light transmits through the half-mirror 33, is collected by the lens 36, and enters the line sensor 37. The focus control unit 40 detects misalignment of the objective lens 22 in the z direction based on the electric signal obtained by the line sensor 37 capturing an image of the regular reflection light, controls the drive unit 42 according to this detection result, and moves the stage 21 in the z direction.

The reference light from the light source 101, on the other hand, is totally reflected by the small total reflection mirror 102, and enters the dichroic mirror 103. Then the reference light is reflected by the dichroic mirror 103, and enters the surface of the cover glass holding the sample 12 via the offset lens group 35 to the objective lens 22. For example, the reference light enters the surface of the cover glass in the parallel beam state.

When the reference light enters the surface of the cover glass like this, a part of the reference light scatters on the surface, and the rest of the reference light is regularly reflected by the surface. The regular reflection light and the scattered light of the reference light generated on the surface of the cover glass transmit through the objective lens 22 to the offset lens group 35, and are reflected by the dichroic mirror 103.

Just like the case of the near-infrared light, the scattered light of the reference light is a light scattered on the surface of the cover glass, therefore quantity is less than the quantity of regular reflection light of the reference light, but the luminous of the scattered light is thicker than the luminous of the regular reflection light.

The regular reflection light of the reference light reflected by the dichroic mirror 103 is reflected by the total reflection mirror 102. This regular reflection light of the reference light is collected in the position of the total reflection mirror 102 so as to be shielded with certainty. A part of the scattered light of the reference light reflected by the dichroic mirror 103 is reflected by the total reflection mirror 102 and the rest of the scattered light is collected by the lens 38, and enters the two-dimensional photoelectric converter 39. In other words, the regular reflection light of the reference light and the part of the scattered light of the reference light, reflected by the dichroic mirror 103, are shielded by the total reflection mirror 102.

The two-dimensional photoelectric converter 39 captures an image of the scattered light of the reference light reflected by the dichroic mirror 103, and the clamp processing unit 41 performs pattern matching using the scattering picture captured by the two-dimensional photoelectric converter 39, and detects the misalignment of the objective lens 22 in the xy direction. Then the clamp processing unit 41 controls the drive unit 42 based on the detection result of misalignment in the xy direction, and moves the stage 21 so as to offset the misalignment in the xy direction. Misalignment in the xy direction is detected after detecting and correcting the misalignment in the z direction.

If misalignment in the xy direction is corrected like this, the processing to detect misalignment of the objective lens 22 in the z direction and correct the misalignment, and the processing to detect misalignment of the objective lens 22 in the xy direction and correct misalignment are alternately repeated.

By detecting misalignment in the z direction and misalignment in the xy direction like this using the near-infrared light and the reference light of which wavelengths are different from each other, misalignment of the relative positions of the objective lens 22 and the sample 12 can be corrected more quickly and accurately.

In the microscope 11 in FIG. 3, to detect misalignment in the xy direction, the reference light of which wavelength is different from that of the near-infrared light used for detecting misalignment in the z direction, is used, hence the reference light of an arbitrary optical system can be used, and accuracy to detect misalignment in the xy direction can be further improved. For example, an optical system which can obtain a larger scattering picture can be used.

If misalignment in the xy direction is detected using the reference light of which wavelength is different from that of the near-infrared light, the quantity of the reference light can be freely changed, hence not only can a drop in quantity of the scattered light be prevented, but also the optical system of the microscope 11 can be designed more freely.

In the microscope 11 in FIG. 3, the offset lens group 35 is disposed on a common optical path of the near-infrared light and the reference light, therefore the image forming position of the near-infrared light and that of the reference light can be moved in the z direction by the same distance at the same time.

In the above description, the regular reflection surface of the near-infrared light and the scattering surface of the reference light are the surface of the cover glass, that is these are the same surface, but this need not be the case. In the examples in FIG. 1 and FIG. 2 as well, the regular reflection surface of the near-infrared light and the scattering surface need not be the same surface. For example, the regular reflection surface of the near-infrared light may be the boundary surface of the cover glass and the sample 12, and the scattering surface of the near-infrared light may be a surface different from the boundary surface on the cover glass.

Embodiments of the present invention are not limited to the above mentioned embodiments, and numerous modifications can be made without departing from the true spirit and scope of the invention.

EXPLANATION OF REFERENCE NUMERALS 11 microscope
12 sample
21 stage
22 objective lens
30 light source
33 half-mirror
34 knife edge
35 offset lens group 37 line sensor
39 two-dimensional photoelectric converter
40 focus control unit
41 clamp processing unit
42 drive unit
71 two-dimensional photoelectric converter
72 knife edge
73 drive unit
101 light source
102 total reflection mirror
103 dichroic mirror

The invention claimed is:

1. A microscope apparatus comprising:
    an objective lens configured to irradiate an illumination light from a light source onto a holding member configured to hold a sample mounted on a stage;
    a light receiving unit configured to receive light from the sample or the holding member;
    an offset optical system configured to adjust a focal position of the illumination light from the light source; and
    a control unit,
    wherein the control unit detects and adjusts a positional relationship between the objective lens and the stage in an optical axis direction of the objective lens and in a direction perpendicular to the optical axis direction of the objective lens in response to the light received from the sample or the holding member by the light receiving unit.

2. The microscope apparatus according to claim 1, wherein the light receiving unit comprises a first light receiving unit and a second light receiving unit, the first light receiving unit receiving first light from the sample or the holding member, and the second light receiving unit receiving second light from the sample or the holding member.

3. The microscope apparatus according to claim 2, wherein the first light is reflection light, and the second light is scattered light.

4. The microscope apparatus according to claim 2, wherein the control unit has a first control unit and a second control unit, the first control unit adjusting the positional relationship between the objective lens and the stage in the optical axis direction of the objective lens based on a signal from the first light receiving unit, and the second control unit adjusting the positional relationship between the objective lens and the stage in the direction perpendicular to the optical axis direction of the objective lens based on a signal from the second light receiving unit.

5. The microscope apparatus according to claim 1, further comprising a light shielding member configured to shield the illumination light.

6. A microscope method comprising:
    irradiating an illumination light from a light source with an objective lens onto a holding member holding a sample mounted on a stage;
    receiving light from the sample or the holding member; and
    detecting and adjusting a positional relationship between the objective lens and the stage in an optical axis direction of the objective lens and in a direction perpendicular to the optical axis direction of the objective lens in response to the light received from the sample or the holding member.

* * * * *